3,626,578
CONVERSION OF METAL SCRAP
TO USEFUL PRODUCTS
Clarence A. Price, Ann Arbor, Mich., and Alvin M. Sabroff and Thomas G. Byrer, Columbus, Ohio, assignors to Hoover Ball and Bearing Company, Saline, Mich.
No Drawing. Filed July 2, 1968, Ser. No. 741,902
Int. Cl. B23q 17/00
U.S. Cl. 29—403                                29 Claims

ABSTRACT OF THE DISCLOSURE

Metal scrap is compacted under ambient conditions and then is consolidated into a solid product by hot working with a high reduction ratio.

BACKGROUND OF THE INVENTION

The invention relates to a new use for a scrap metal and relates in particular to a new and novel method for consolidating such metal into useful articles.

Scrap metal such as scrap steel, copper, etc., has long been a necessary by-product of most metal manufacturing procedures, particularly those concerned with the fabrication of metal products from metal to sheet and strip form. For example, in the stamping of laminations for electric motor cores and the like from steel strip, the portion of the strip between the stampings or perforations left in the strip after stamping usually constitutes a major part of the original strip metal. The usefulness of such scrap metal until now has been limited to remelting.

Other examples of wasteful (though necessary) scrap production include metal trimming, borings, machine chips, turnings and particles produced by shredding large pieces of steel.

In the past, much steel scrap was conveniently remelted when employing an open-hearth furnace, but only limited quantities of analytically acceptable scrap may be remelted in the basic oxygen converters used increasingly at this time, because many residual contaminants may not be removed effectively. As a consequence of the evolution of the basic oxygen converter the value of steel scrap for remelting has seriously diminished.

Additionally, reactive metals, such as titanium and zirconium, are not conventionally produced by melting procedures that readily permit the utilization of scrap for remelting. Consequently, titanium and zirconium scrap metal has a disproportionally low market value when compared to its high initial cost.

SUMMARY OF THE INVENTION

We have now discovered a procedure whereby metal scrap may be consolidated directly into useful metal products, bypassing the conventional steps of remelting and hot working ingots into desired products.

Our invention consists of first compacting the scrap under ambient conditions into a heterogeneous billet and then hot working said billet with a high deformation under conditions which, through a solid state consolidation, will practically restore the theoretical density held by the material when solid.

The initial compacting may be accomplished by a variety of apparatus. For example, it is conventional practice to "bale" steel scrap for remelting by compressing it into rectangular blocks for easy handling. However, this easy handling generally does not require a degree of compaction high enough for carrying out the invention. We have found it to be particularly advantageous to effect the initial compaction by placing the scrap in a cylindrical container and compressing it with a close-fitting hydraulic press plunger. We find that this arrangement permits us to attain a high degree of initial compaction and allows us to attain a substantially void-free dense product during the subsequent hot compression step.

Although voids in the initial compacted scrap billet may be tolerated to a surprising extent, it is, of course, preferred that they be minimized. We have found an ambient compaction to at least about 40% of theoretical completely dense (wrought or cast) material to be essential in obtaining a product of sufficient continuity for commercial use. For reactive metal and alloy scrap such as titanium and zirconium alloy scrap a more realistic minimum ambient compaction is about 50% of the theoretically completely dense material.

Instances may occur wherein it is desirable to employ the minimum compaction referred to above, but compactions of 70% of theoretical and greater are recommended for the initial compaction step.

Although the "ambient" conditions referred to in conjunction with the initial cold compaction step will generally be normal room temperature (i.e., 0–100° F.), and preferably will be some temperature near but below the recrystallization temperature of the scrap metal to be consolidated, such temperature may be any temperature at which substantial fusion does not occur or at which the metal is not significantly oxidized.

The second step of the process achieves a solid state consolidation by submitting the billet to a pressure at a temperature and with a tooling which cause the billet to be highly deformed into a dense mass which exceeds at least 90% of theoretical complete density and preferably approaches theoretical 100% density (i.e., over 98%).

The temperature of the consolidation step should correspond to that temperature, which may be referred to as "plastic deformation temperature," which will give sufficient plasticity for hot working the metal from which the scrap is derived. The range of such temperature is well-known to those who make metallurgical products from conventional raw materials. For example, when we apply the method of the present invention to steel scrap, we prefer to utilize a consolidating step at a temperature of from about 2000° F. to 2300° F. Where we are utilizing scrap of a titanium base alloy we prefer a temperature of from about 1400° F. to 2000° F.

As a starting material, we prefer scrap metal which possesses at least one small dimension or gauge; for example, sheet, strip or wire metal scrap which has a gauge of about 0.20" gauge or less. Metal scrap that consists essentially of machine shop trimmings, borings, machine chips, and turnings all meet such qualifications and are appropriate materials for carrying out the process of the present invention. However, it is preferred that a major portion of the scrap consist of sheet metal trimmings (i.e. 60% or greater). Any "shredded" metal composed largely of pieces of metal which average 0.20" gauge or less is satisfactory. It is impractical to employ large parts such as automobile motor blocks.

Although scrap in the form of strip (i.e., sheet stampings, automobile bodies, etc.), wire, trimmings, borings, chips, turnings, etc., may be of any length it is preferred to shred material such as sheet or strip metal or reduce it in some manner to particles ranging from 0.1" to 20" in their longest dimensions so that when compacting the scrap materials the long dimensions will function to tie the material together and subsequently to provide a desirable grain structure of the consolidated product.

It is preferred that the scrap be reasonably free of surface contaminants including rust or scale although the process is surprisingly tolerant of such surface contaminants. In most instances where the consolidating step is accomplished in a press such as an extrusion press, it is not necessary to purge the extrusion chamber of air provided that heating to extrusion or consolidation temperature has been so conducted so as to avoid any substantial oxidation. This can be done, for instance, by using a furnace with a controlled combustion of its fuel. Where the scrap is a reactive material such as a titanium or zirconium base alloy (as well as molybdenum, columbium, tantalum and tungsten) it is preferred to "can" the material by enclosing it in a container or can during the initial compaction step and by evacuating and seating the can prior to heating the thus constituted billet to consolidation temperature. Where the scrap is steel, canning is not necessary, and heating may sometimes be conducted without any special precaution.

Such "canning" may be in a container of a material similar to the scrap material, in which case the final product (rod, wire, etc.) includes the "can"; or the can may be of a different metal or alloy (i.e., titanium in steel) in which event the can or skin of the final product must be removed (as by dissolving the steel skin from an extruded titanium billet).

We have had particular success in selecting the extrusion process for carrying out the consolidating step of the present invention. A 40–70% of theoretical dense billet having been obtained by compressing scrap under ambient conditions in the container of a hydraulic press and having been heated to plastic deformation temperature, it is positioned in an extrusion chamber from which it is extruded into a rod, a wire or a shaped product. For making hollow products such as tubes, a billet compacted to 40–70% density may be placed into the chamber of a piercing press for further compacting and hot piercing into a hollow billet before being extruded into a tubular product. In some cases, a billet may also be compacted to about 40% density, be heated to plastic deformation temperature, be placed into a press container, be hot compressed to a density of about 80% without being pierced and lastly be extruded. We have found such products to be the substantial equivalent to such products produced by conventional extrusion means.

The grade of deformation required during hot working to form a product of the desired density and cohesion is dependent upon the scrap metal involved, and the temperature of the heated billet. When hot working is carried out in the preferred manner, i.e., by hot extrusion, the necessary extrusion ratio may vary widely, but it should however be equal to at least 40 to 1. Where the scrap is steel and the extrusion temperature is from about 2000° F. to 2300° F. an extrusion ratio of 100 to 1 or greater is preferred. Where the scrap metal is a titanium-base metal and the extrusion temperature is from about 1400° F. to 2000° F. an extrusion ratio of at least 40 to 1 is also required.

The preferred lubricants applied to the die when the method of the present invention is applied to the extrusion of scrap metal at temperatures above 800° F. include glass-like lubricants employed for the conventional extrusion of the same materials in solid form, according, among others, to U.S. Pats. 2,538,917 and 2,946,437.

Such glass-like materials are selected within the group of salts, oxides and mixtures thereof, which at the extrusion temperature have a wide viscosity range as opposed to a true melting point, are incombustible and can progressively melt into a continuous viscous film. They are used in the form of a powder, agglomerated into discs.

The lubrication of the lateral surface of the billet when sliding along the walls of the press container is advantageously performed by a glass-like material, as taught by U.S. Pat. 2,908,587. When the scrap itself constitutes the lateral surface of the billet, this lubrication may be performed by a grease or a mixture including a grease and a glass-like material, according to French Pat. 1,440,651.

It is also appropriate to replace the commonly used tool steel on the working surface of the die by a high refractory ceramic material, such as zirconia. This can be done either by ceramic coating the entry of a whole steel die, or by fitting a ceramic insert including the die entry into an appropriately shaped steel casing. The optimum results in carrying out the consolidation or extrusion step of the invention are realized when the working surface of the die and the lubrication thereof are such as to provide streamlined flow of the extruded billet material through the die orifice so that the outside surface of the billet becomes the outside surface of the extrudate.

The following examples illustrate some embodiments of the invention:

Example 1

Loose, clean mild steel scrap in three gages of thickness was used. It contained about equal amounts of 0.0375-inch-thick sheet trim and 0.026-inch-thick sheet stamping scrap, with less than 10 percent of the total scrap weight being deep-drawn cup trim about 0.115–0.120 inch-thick.

Billet compaction was accomplished on a 700-ton HPM press. Tooling consisting of a heavy-walled container, two compacting rams, and an extension sleeve to permit extra loading capacity in the container. The scrap was loaded into the top opening until both the container and extension sleeve were full. The upper ram was then advanced until all material had been compacted below the top of the container. The ram was then retracted, the extension sleeve removed, and compaction resumed to the desired level. Compaction of each billet required four individual compactions in order to get the desired weight of material into the compaction chamber. After each compaction operation, several pieces of flattened scrap were pulled up or straightened in the top of the compact to enable joining of one compact section to the next.

Scrap weights were calculated to produce an extrusion billet of 70 percent average density in most cases. The extrusion billets (70 percent dense) were 5.850 inches in diameter by 16 inches long and weighed 85 pounds. They were heated to 2200° F. in a muffle under protected atmosphere and extruded into a ½ inch rod from a 2,750 ton extrusion press (the extrusion ratio was 144 to 1). The dies, made of steel according to common practice, were preheated to 800–900° F., the container was preheated to 600–900° F. The lubricants for die and lateral surfaces consisted of window glass. The ram speed was 3 to 4 i.p.s.

Tensile properties.—Mechanical property data on selected samples of extruded rod are shown in the following table. Included are typical handbook values for the properties of low carbon steel:

| Rod end | Ultimate tensile strength, 1,000 p.s.i. | Yield strength, 1,000 p.s.i. | Elogation, percent in 2 inches | Reduction in area, percent |
|---|---|---|---|---|
| Front | 54.3/54.5 | 35.9/35.6 | 26.0/25.0 | 79/78 |
| Rear | 54.5/50.5 | 35.9/30.1 | 28.0/25.5 | 79/80 |
| Handbook data [a] | 45–65 | 30–45 | 30–40 | 50–65 |

[a] Annealed condition.

Results showed that mechanical properties were comparable to handbook data and generally duplicated the properties obtained with laboratory scale extrusions that had previously been conducted.

Metallographic examination.—Representative samples of extruded rod were examined metallographically. Despite the poor surface appearance of the extruded rod, microscopic examination indicated good metal soundness in the majority of the sample cross sections. This was also borne out by the tensile data.

Wire drawing.—Sections of some extrusions were sandblasted and cold drawn on bullblocks.

On the initial drawing passes, the wire surfaces were generally roughened or wavy in appearance. However, with further cold reduction, the surface ruptures appeared to heal. Sections of the wire were drawn without difficulty to 1/32 inch diameter; a total reduction of over 99 percent.

The following tensile properties were obtained on the wire after the cold drawing operations:

Total drawn reduction—50%
Ultimate tensile strength—88,700–88,400 p.s.i.
Yield strength—75,400–75,200 p.s.i.
Elongation percent in 2 inches—12.5/11.5
Reduction in area percent—64/62

Example II

Scrap conversions were conducted under the same conditions as in Example I except for the following:

Billet density 80 percent
Ram speed 1–2 i.p.s.
Die temperature 600–700 F.
Grease alone was used as container lubricant. It was applied by swabbing the container wall before each extrusion trial.
Steel dies were machined to accommodate shrink fitted zirconia inserts.

The use of the ceramic die plus the use of higher density billets brought significant improvements in extruded surface quality. The surface of the extruded product was very smooth and of good quality for drawing.

According to rod diameter measurements, approximately 0.009" of wear occurred on the ceramic die diameter after 10 extrusions, when approximately 1200 feet of extruded rod were produced. The second die showed 0.007" of wear after six extrusions, whereas bare steel dies had not been able to stand more than one push.

Metallographic examination.—Results were similar to those reported on the previous example except that surface conditions were much improved. Internal soundness was good and samples showed a high degree of cleanliness. A few inclusions were noted but they were isolated and would not present any problems in further fabrication into wire.

Wire drawing.—No difficulties were encountered during the drawing operations from extruded rod to wire sizes on the order of 0.050 to 0.060" (i.e. a 99% reduction). Below this point, some wire breakage began to occur. Yet approximately 1300 feet of wire was drawn to 0.032 to 0.036".

Ultimate tensile strengths and reductions in area were obtained on the 75% cold-drawn wire. Results are tabulated herebelow:

| Number of tests | Ultimate tensile strength, 1,000 p.s.i. | | Reduction in area (percent) | |
|---|---|---|---|---|
| | Average | Range | Average | Range |
| 9 | 114.8 | 112.1–115.8 | 51.6 | 51–53 |
| 13 | 121.2 | 115.4–123.4 | 46.6 | 40–52 |
| 5 | 114.7 | 113.5–116.5 | 51.8 | 50–53 |
| 9 | 114.4 | 112.5–118.3 | 53.4 | 50–56 |
| 11 | 115.6 | 108.3–118.2 | 51.1 | 45–56 |
| 12 | 107.4 | 104.0–110.0 | 56.9 | 50–63 |

These data agree with handbook properties of cold-drawn, low-carbon steel.

Example III

Titanium alloy (Ti-7Al-4Mo) scrap was compacted in the 3.125 in. diameter container of an 80 ton hydraulic press.

A mild steel can formed by a 12 inches long tube with a plate welded at its lower end was first inserted into the press container, then filled up with scrap. After applying the load, placing an upper end plate, cutting the extra length of the can, evacuating and electron beam welding, a 6 inches long billet was obtained with a 50% density.

For the second step (hot consolidation), this billet was heated to 1,950° F., placed into the 3.275 inch I.D. container of a 700 ton hydraulic extrusion press together with glass lubricant and extruded into a 3/8 inch rod (i.e. with an extrusion ratio of 77 to 1).

The container had been preheated to 700° F.
The ram speed was 1.333 i.p.s.
The steel sheath was removed by pickling.

The extruded rods were very smooth. Their radiographic examination did not detect any gross internal porosity or laminations. Their actual density was not noticeably different from theoretical.

Tensile properties were very comparable to standard handbook data:

| | Sample measurements | Handbook data under annealed condition |
|---|---|---|
| Ultimate tensile strength, p.s.i. | 169,000/169,500 | 160,000 |
| Yield strength, p.s.i. | 142,900/142,700 | 150,000 |
| Elongation in 1 inch, percent | 10/11 | (1) |
| Reduction in area, percent | 8 | |

[1] 16% on 2 inches.

Metallographic examination.—The Ti-7Al-4Mo alloy showed good densification. Examination showed only a few small voids in the structure.

Example IV

Scrap conversions of mild steel scrap and of AISI 52100 alloy steel were also conducted in which billets were formed by compacting them in the 3.125 inch internal diameter container of an 80 ton hydraulic press. The billets formed by compacting the mild steel had 65 to 75 average density and the billets formed by compacting AISI 52100 alloy steel had 50 to 55 percent average density.

For the second step (hot consolidation) these billets were heated to 2250° F., placed into the 3.275 inch internal diameter container of a 700 ton hydraulic press together with a glass lubricant and extruded into 3/8 inch rods (i.e. with an extrusion ratio of 77 to 1).

The density of the extruded rods of mild steel and AISI 52100 alloy steel as well as the rods of titanium formed in Example III were then determined by using the volume-displacement technique in water at 20° C. The mild steel had a density of 99.7 percent of theoretical density; the AISI 52100 alloy steel had a density of 99.6 percent of theoretical density; and the titanium alloy had a density substantially 100 percent of theoretical density.

We claim:

1. A process for converting scrap metal consisting essentially of one metal selected from the group of titanium, zirconium, molybdenum, columbium, tantalum, tungsten and steel to a useful product of sound metallurgical quality comprising the steps of compacting said scrap metal at ambient temperature into a billet having an average density of at least 70% of the theoretical density of the metal, heating the compacted billet to a temperature sufficient to permit the subsequent solid state consolidation of the compacted billet to about 100% of the theoretical density of the metal, and consolidating the heated compacted billet at said temperature by hot extruding it from an extrusion press at an extrusion ratio of at least 100 to 1 to form a product having said density.

2. A process according to claim 1 wherein said heating is conducted in an atmosphere substantially non-contaminating to said scrap metal.

3. A process according to claim 2 wherein said atmosphere is still air.

4. A process according to claim 2 wherein said atmosphere is provided by the controlled combustion of a combustible substance.

5. A process according to claim 1 wherein use is made of an extrusion die, at least the surface of the orifice entry of which has been coated with a ceramic layer.

6. A process according to claim 1 wherein use is made of an extrusion die formed of a steel casing in which is housed a shrink-fitted ceramic insert containing a die orifice of the desired geometry.

7. A process according to claim 1 wherein said extrusion step includes lubricating said billet and the extrusion die of said extrusion press.

8. A process according to claim 7 wherein the die lubricant comprises a glass-like material which, at said extrusion temperature, has a wide viscosity range as opposed to a true melting point, is incombustible and progressively melts into a continuous film.

9. A process according to claim 8 wherein said extrusion press has a billet container preceding said extrusion die and the lubrication of the lateral surface of said billet is effected by interposing a non-glass-like lubricant between said lateral surface and said container.

10. A process according to claim 9 wherein said non-glass-like lubricant is a grease.

11. A process according to claim 8 wherein said extrusion press has a billet container preceding said extrusion die and the lubrication of the lateral surface of said billet is effected by interposing a mixture of non-glass-like lubricant and of glass-like lubricant between said lateral surface and said container.

12. A process according to claim 8 wherein the lateral surface of the billet is also lubricated with said glass-like material.

13. A process according to claim 1 wherein said compacting is performed in a cylindrical metal container having at least a lateral wall and becoming part of said billet for its subsequent working.

14. A process according to claim 1 wherein said scrap metal is scrap steel, and wherein said temperature sufficient to allow subsequent solid state consolidation of the compacted billet is about 2000° F. to 2300° F.

15. The process of claim 1 wherein said scrap is composed of pieces of metal which possess at least one dimension which averages 0.20 inch gauge or less and another dimension which averages 0.20 inch gauge or greater.

16. The process of claim 15 wherein said scrap consists essentially of at least one of the materials sheet scrap, strip scrap, wire scrap, machine shop trimmings, borings, machine chips and turnings.

17. The process of claim 16 wherein said scrap is composed of at least 60% by weight, of at least one of the materials sheet scrap and strip scrap.

18. A process according to claim 1 wherein consolidating the heated compacted billet includes the step of hot compressing the billet in a closed chamber prior to the step of hot extruding the billet from an extrusion press.

19. A process according to claim 1 wherein consolidating the heated compacted billet includes the steps of hot compressing and hot piercing the billet in a piercing press and of hot extruding the hot pierced billet from an extrusion press into a useful hollow product.

20. The process of claim 1 wherein consolidating the heated compacted billet is effected in an extrusion chamber so that said billet is extruded through an extrusion die during said step, said extrusion chamber and die being formed to provide streamlined flow of the billet material through the die so that the outside surface of the billet becomes the outside surface of the extrudate.

21. The process of claim 1 wherein said scrap metal is steel, and the temperature of the billet at the consolidation step is within the range of 2000° F. to 2300° F.

22. The process of claim 1 wherein the scrap metal is titanium or titanium alloy, and the temperature of the billet at the consolidation step is within the range of 1400° F. to 2000° F.

23. A process according to claim 1 wherein said scrap metal is liable to atmosphere contamination when hot, and wherein said compacting is performed in a cylindrical metal container to achieve an average density equal to at least 70% of the theoretical density of the scrap, and is immediately followed by the steps of closing, evacuating and sealing the container to form a billet substantially free of air.

24. A process according to claim 23 wherein the metal container is formed from a metal having similar deformation characteristics to said scrap metal.

25. A process according to claim 23 wherein the atmosphere in which the billet is heated is non-contaminating to the container providing the outside billet surface.

26. A process according to claim 23 wherein said hot extrusion includes lubricating the die and lateral surface of the billet with a glass-like material which has at said temperature a wide viscosity range as opposed to a true melting point, is incombustible and progressively melts into a continuous film.

27. A process according to claim 26 wherein said scrap metal is titanium or titanium alloy and said temperature sufficient to allow subsequent solid state consolidation of the billet is about 1400° F. to 2000° F.

28. A process for converting scrap steel to a useful product of sound metallurgical quality comprising the steps of compacting said scrap steel at ambient temperature into a billet having an average density of at least 70% of the theoretical density of the steel, heating the compacted billet to a temperature about 2000° F. to 2300° F. to permit the subsequent solid state consolidation of the compacted billet to about 100% of the theoretical density of the steel, and consolidating the heated compacted billet at said temperature by hot extruding it from the extrusion die of an extrusion press at an extrusion ratio of at least 100 to 1 to form a product having said density, said extrusion step including lubricating said extrusion die with a glass-like material which has at said temperature a wide viscosity range as opposed to a true melting point, is incombustible and progressively melts into a continuous film.

29. A process for converting scrap metal, consisting essentially of one metal selected from the group of titanium, zirconium, molybdenum, columbium, tantalum, tungsten and steel to a useful product of sound metallurgical quality comprising the steps of compacting said scrap metal at ambient temperature into a billet having an average density of at least 70% of the theoretical density of the metal, heating the compacted billet to a temperature sufficient to permit the subsequent solid state consolidation of the compacted billet to about 100% of the theoretical density of the metal, and consolidating the heated compacted billet at said temperature by hot extruding it from the extrusion die of an extrusion press at an extrusion ratio of at least 100 to 1 to form a product having said density, said extrusion step including lubricating said extrusion die with a glass-like material which has at said temperature a wide viscosity range as opposed to a true melting point, is incombustible and progressively melts into a continuous film.

References Cited
UNITED STATES PATENTS

| | | | |
|---|---|---|---|
| 99,574 | 2/1870 | Jones | 29—403 |
| 188,396 | 3/1877 | Meysenburg | 29—403 |
| 2,287,951 | 6/1942 | Tormyn | 29—420.5 X |
| 2,333,271 | 11/1943 | Paterson | 29—420.5 |
| 2,358,667 | 9/1944 | Stern | 29—403 X |
| 2,391,752 | 12/1945 | Stern | 29—403 X |
| 2,457,861 | 1/1949 | Brassert | 29—420.5 |
| 2,123,416 | 7/1938 | Graham. | |
| 2,206,395 | 7/1940 | Gertler. | |

JOHN F. CAMPBELL, Primary Examiner

D. C. REILEY, Assistant Examiner

U.S. Cl. X.R.

29—420.5, DIG. 45, DIG. 47